United States Patent [19]

Schmid

[11] 3,933,211

[45] Jan. 20, 1976

[54] BUOYANCY BALANCE

[75] Inventor: Peter Schmid, Vienna, Austria

[73] Assignee: Mettler Instrumente AG, Greifensee, Switzerland

[22] Filed: Aug. 15, 1974

[21] Appl. No.: 497,618

[30] Foreign Application Priority Data

Sept. 4, 1973  Austria .............................. 47654/73
Sept. 28, 1973  Austria .............................. 48345/73

[52] U.S. Cl. ................................................. 177/207
[51] Int. Cl.² ......................................... G01G 5/02
[58] Field of Search ............................. 177/180, 207

[56] References Cited
UNITED STATES PATENTS

| | | | |
|---|---|---|---|
| 1,199,687 | 9/1916 | Gephardt ............................ | 177/207 |
| 2,087,146 | 7/1937 | Hawkins ............................. | 177/207 |
| 2,462,216 | 2/1949 | Newak ................................ | 177/207 |
| 2,544,032 | 3/1951 | Lange et al. ....................... | 177/180 |

Primary Examiner—L. T. Hix
Assistant Examiner—Vit W. Miska
Attorney, Agent, or Firm—Werner W. Kleeman

[57] ABSTRACT

A buoyancy balance incorporating a buoyant body floating in a fluid and a load bowl or scale operatively coupled with the buoyant body. The invention contemplates the provision of means for partially compensating the change in buoyancy brought about by the movement of the load bowl.

10 Claims, 3 Drawing Figures

BUOYANCY BALANCE

BACKGROUND OF THE INVENTION

The present invention relates to a new and improved construction of buoyancy balance of the type equipped with a buoyant or floating body floating in a fluid and a load bowl or scale operatively coupled with such buoyant body.

Balances of this type are based upon the physical principle, also known as Archimedes' principle, that a body immersed in a fluid undergoes a decrease in weight which corresponds to the weight of the fluid displaced by such body. A major advantage of such balances resides in the fact that they can be constructed practically free of mechanical friction.

Balances of the type under discussion have already become known to the art in many different constructional embodiments, as exemplified for instance by German Pat. Nos. 5931 or 335,786 relating to upper-bowl balances, Swiss Pat. No. 74,648 or U.S. Pat. No. 2,544,032 relating to lower-bowl balances. All of the state-of-the-art balances have common thereto a characteristic feature, namely, during a movement of the load bowl or scale, as such is brought about by a change in the load, the immersion depth of a displacement body changes for such length of time until the increase in load is compensated by the gain in buoyancy. The aforementioned displacement body generally is constituted by an element which interconnects the buoyant body with the load bowl, directly or however indirectly, i.e. through the agency of a rod, and such element is generally in the form of a pressure rod which piercingly extends through a boundary surface of the fluid. Since this element must possess for mechanical reasons (strength) a minimum cross-section which is dependent upon the maximum weight (dead load and weighing range), the sensitivity of the balance, that is to say, the change in the immersion depth for each unit of load change, is dependent upon the total weight and therefore such sensitivity is relatively low.

SUMMARY OF THE INVENTION

Hence, it is a primary object of the present invention to provide an improved construction of buoyancy balance which is not associated with the aforementioned drawbacks and limitations of the prior art proposals.

Another and more specific object of the present invention aims at the provision of a new and improved construction of buoyancy balance wherein the sensitivity of the balance is considerably increased independent of the total weight.

Yet a further significant object of the present invention aims at the provision of a new and improved construction of buoyancy balance which is relatively simple in design, extremely reliable and accurate in operation, not readily subject to breakdown, and requires a minimum of maintenance and servicing.

Now in order to implement these and still further objects of the invention, which will become more readily apparent as the description proceeds, the buoyancy balance of the previously mentioned type as contemplated by the invention is equipped with means which partially compensate the change in buoyancy brought about by the movement of the load bowl. Stated in another way, the change in buoyancy due to the changed immersion of a displacement body has associated therewith an opposite force which is brought about by the provision of the means contemplated by the invention, with the result that there is realized for a given change in load a larger displacement or path of the load bowl.

Depending upon the selection and arrangement of the means there can be produced random resulting buoyancy characteristics of linear or non-linear configuration (normally there being desired however a linear characteristic), so that there can be realized an almost optional great sensitivity. Through the use of substitution weights it is possible to considerably extend the weighing range past the actual adjustment range which is limited by the respective upper and lower boundary position of the buoyant body.

The selection of the means for the partial compensation of the buoyancy change is basically freely possible. Thus, for instance, it is conceivable to provide mechanical means. However, such would constitute both a certain "roundabout way" as well as also an appreciable expenditure, since of course mechanical friction should be avoided. The use of magnetic means is furthermore conceivable, but such is confronted with the problem that magnetic means generally only permit small displacements, whereas relatively large positional changes of the buoyant body are desired; hence they only come into consideration for special situations. A particularly preferred technique for realizing the desired compensation force resides in utilizing buoyancy. Therefore, the means can encompass, for instance, a gas cushion connected with the buoyant body. During lowering of the buoyant body this gas cushion is more markedly compressed together and there results a loss in buoyancy having approximately hyperbolic characteristic. A possibility for obtaining a linear buoyancy loss during sinking of the buoyant body is realized with an arrangement of a supplementary element which piercingly extends through a boundary surface of the fluid. This possibility can be particularly advantageously realized in that the load bowl or scale is arranged suspended at a wire below the buoyant body and the supplementary or auxilliary element is constituted by a further wire, both wires possessing different cross-sections. Such balance, which is particularly suitable for small loads, permits of extremely high sensitivity by fine adaptation of the wire diameter.

Another preferred possibility for realizing a linear buoyancy gain- or loss-characteristic respectively, especially for balances with pressure rods connected from above with the buoyant body, is manifested by the features that a separate fluid-filled container is arranged externally of the fluid and immersed in this container is a pipe which is connected with a second pipe, the second pipe being secured at the buoyant body in such a manner that it is completely located within the fluid.

Basically with the inventive balance the load bowl or scale can be arranged above, below and also adjacent the buoyant body. If the load bowl is arranged beneath the buoyant body at a balance equipped with pressure rod(s) then it is preferably coupled through the agency of a hinge connection with the rod.

When greater requirements as concerns the accuracy and sensitivity of the balance are made then the surface tension of the fluid begins to have a disturbing effect. According to a preferred embodiment of the invention the fluid therefore is provided with an additive which reduces its surface tension. Furthermore, there is the possibility of providing the elements which immerse into the fluid at least partially with a coating which changes the adhesion of the fluid at such elements.

Since the buoyancy is appreciably dependent upon the density of the fluid and therefore upon its temperature, it is particularly advantageous in the case of absolute weighing operations if the fluid is equipped with a thermostat. On the other hand, for relative measurements, for instance changes in weight as a function of time, temperature changes often times do not play any significant role.

The inventive balance is exceptionally suitable, for instance, for the determination of small changes in weight or differences with large absolute weight of the weighed material.

BRIEF DESCRIPTION OF THE DRAWINGS

The invention will be better understood and objects other than those set forth above, will become apparent when consideration is given to the following detailed description thereof. Such description makes reference to the annexed drawings which are not drafted to scale and wherein throughout the various figures the same or similar components have been conveniently designated by the same reference characters, and wherein.

DETAILED DESCRIPTION OF THE PREFERRED EMBODIMENTS

Figure 1:
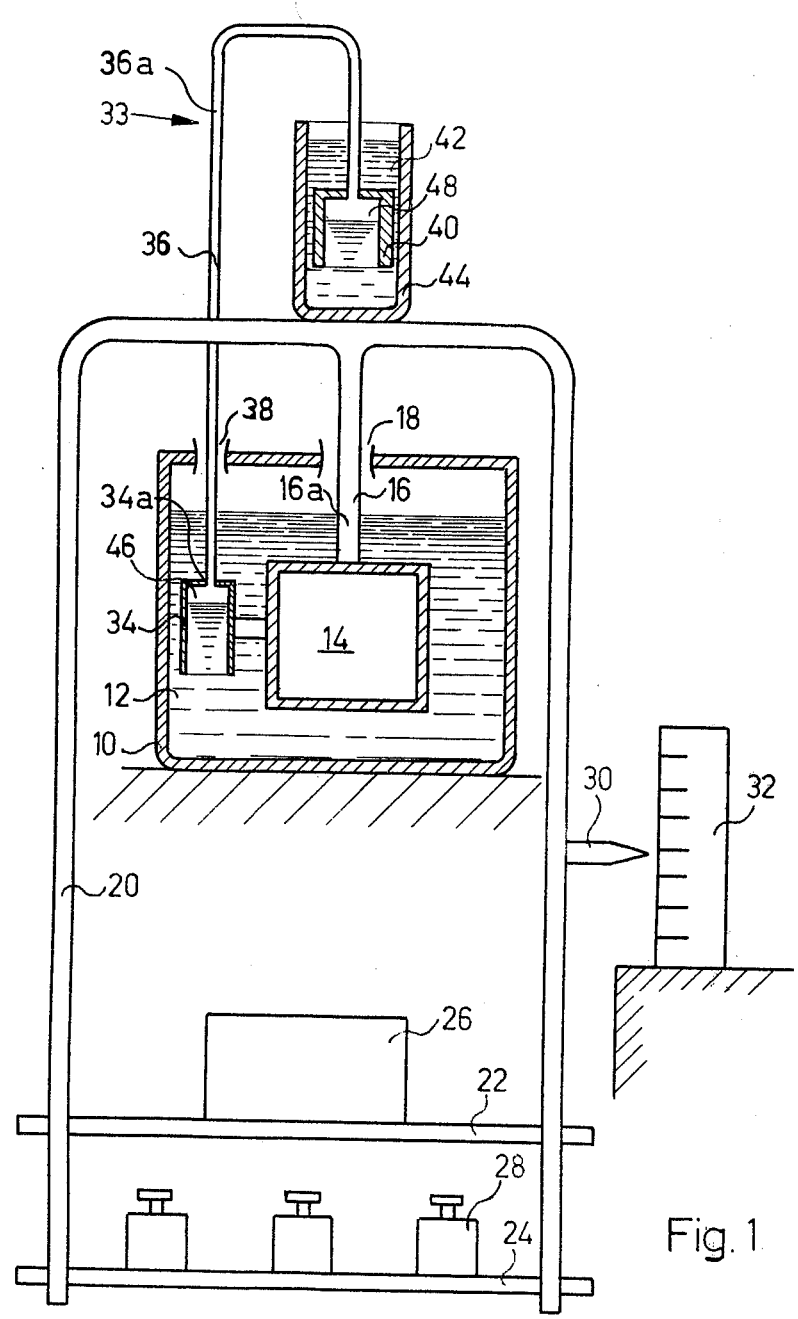
FIG. 1 is a front view, partially in section of a first exemplary embodiment of load balance designed according to the teachings of the present invention.

Describing now the drawings, the exemplary embodiment of load balance depicted in FIG. 1 will be understood to comprise a stationarily arranged container 10 which is extensively filled with a fluid, here assumed to be water 12. Located in the water 12 so as to freely float therein is a closed hollow body 14 constituting a buoyant or floating body. The hollow body 14 is rigidly connected by means of a pressure rod 16, which is guided through an opening 18, with a rod or rod arrangement 20. Beneath the container 10 there are arranged a load bowl or scale 22 and a weight bowl or scale 24, these bowls being carried by the rod arrangement 20.

Prior to beginning a weighing operation the buoyant body 14 floats in its null position near to its upper boundary position. For the purpose of weighing a load 26 weights 28 are removed from the weight bowl or scale 24 for such length of time until the fine range has again been obtained. This is determined by the displacement between the upper and the lower stops (not shown) of the buoyant body 14 (and the therewith associated buoyancy change due to the different immersion of the pressure rod 16 as well as a part of a mechanism 33 to be described more fully hereinafter). This displacement corresponds to the displacement of a pointer 30 secured at the rod 20, this pointer 30 moving past a stationary scale 32 which is conveniently calibrated in units of weight. The weight of the load 26 can be determined in conventional manner from the summation of the removed substitution weights 28 and the indication at the scale 32.

Now for the purpose of increasing the sensitivity as contemplated by the invention there is provided the following mechanism 33: at the buoyant body 14 there is attached a tubular or pipe element 34. This pipe element 34 is open at the bottom and at its upper end which is closed there is mounted a second thin pipe or tube 36 which communicates via an opening 34a with the interior of the pipe element 34. The pipe 36 is guided towards the outside through an opening 38 in the container 10 and opens into the remaining closed upper end of a further pipe element 40. This pipe or tubular element 40, which is open at the bottom, immerses completely into a container 44 which is open at the top and filled with water 42. The container 44 is mounted at the rod arrangement 20.

The described mechanism 33 operates as follows: with an increase in weight (load 26 less the value of the substitution weights which have been removed) the buoyant body 14 sinks downwardly and together therewith the pipe element 34. Owing to the increasing hydrostatic pressure water ascends within the tubular or pipe element 34 upwardly and expels a certain amount of air out of the hollow compartment 46 into the hollow compartment 48 of the second tubular element 40, so that the buoyancy of the tubular or pipe element 34 reduces. The degree of the thus resultant loss in buoyancy is dependent upon the relationship of the internal diameters of the pipe or tubular elements 34 and 40, wherein the linearity is determined by the accuracy of such internal diameters. It is advantageous to select the internal diameter of the pipe element 40 so as to be appreciably grater than that of the pipe element 34 in order to reduce the influence of a change of the hydrostatic pressure upon the air volume (hyperbolic characteristic) and which influence reduces the linearity. Furthermore, it is advantageous to maintain the internal diameter of the connection pipe (or hose) 36 very small in order to reduce the influence of temperature changes upon the air volume.

The water 12 and 42 contains a conventional additive of a suitable liquid tension relieving means. Furthermore, the pressure rod 16 and the connection pipe 36 can be equipped with a plastic coating, as has been conveniently schematically indicated by reference characters 16a and 36a respectively. Due to these measures it is possible to reduce the surface tension of the water and therefore its adhesion to the aforementioned elements to such an extent that the weighing operation is practically no longer influenced thereby.

A balance of the type here under discussion can be used over a longer time span as a balance for patients. The load bowl or scale 22 is constructed as a seat for the patient and with a weighing range of 120 kg it is possible to exactly determine the loss in weight, governed by the metabolism, as a function of time up to about 10 mg. To this end the patient is weighed and then, following the patient taking his place at the load bowl or scale 22, tared in the adjustment range and there is noted the exact pointer or indicator position as determined by the pointer 30 and scale 32. Then there are added 10 gms to the weight bowl. Thereafter one waits until the same pointer position has again been reached as was present prior to the addition of the 10 gm weight, and the time required for this is then noted. From this information (weight of the patient and reduction of his weight by 10 gms in the determined time) it is possible to calculate his specific reduction in weight in mg per kg body weight per minute, and which values permit of valuable diagnostic conclusions.

Furthermore, it has been found that the previously discussed patient balance is very robust and does not require a great deal of maintenance. The maintenance is essentially limited to the refilling of any possibliy evaporated water. Temperature effects play a negligibly small role. Furthermore, it has been found that the buoyant body 14 always strives to freely float, i.e. after a possible impact against the container wall does not "remain stuck", rather immediately again releases therefrom.

Figure 2:
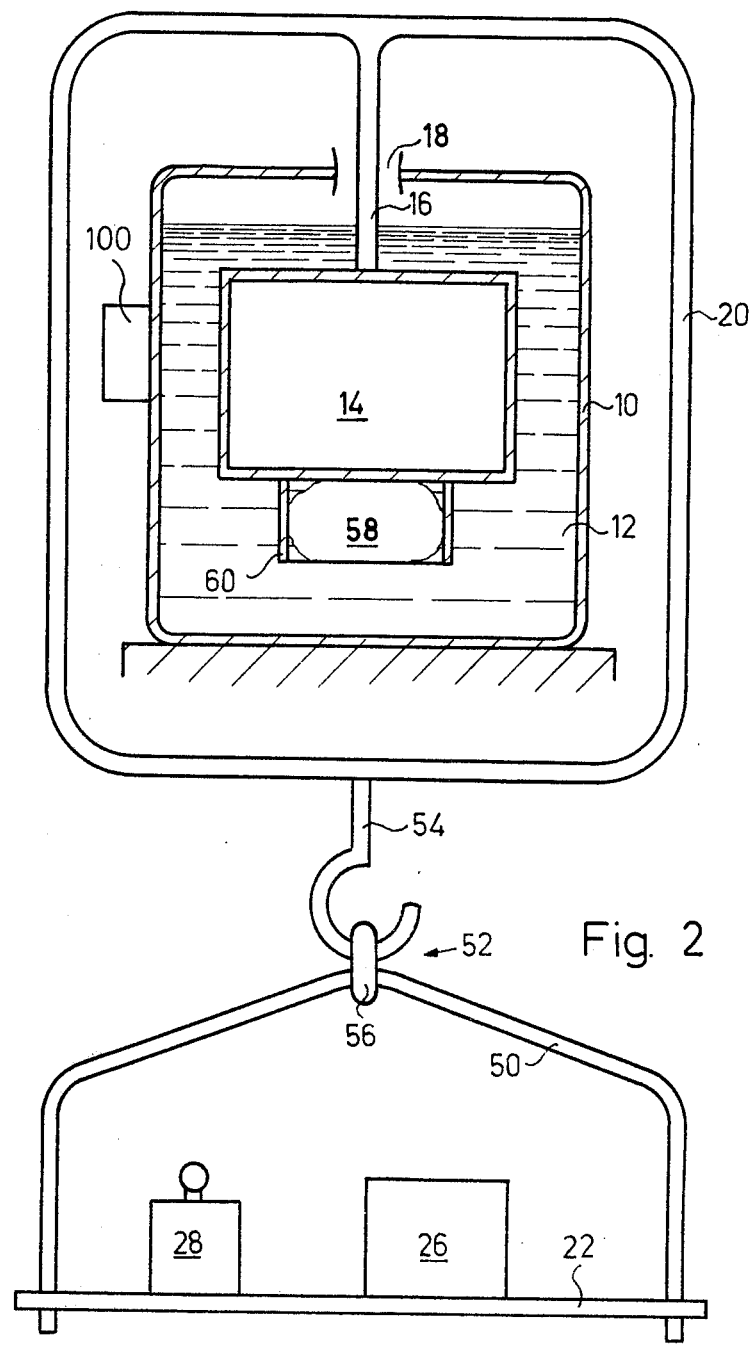
FIG. 2 is a front view, partially in section, of a variant embodiment of the load balance depicted in FIG. 1.

The modified version of balance illustrated in FIG. 2, is similar to that shown in FIG. 1. However, in this case the load bowl or scale 22 is freely suspended via suspension arrangement 50 at a hinge connection or joint 52. The hinge connection is formed by a hook 54 secured to the rod arrangement 20 and an eyelet 56 formed at the suspension arrangement or hanger 50.

In this case the partial buoyancy compensation is realized by means of an air-filled watertight elastic balloon 58 which is entrapped in a cylindrical extension or projection 60 provided at the buoyant or floating body 14. During a sinking of the buoyant body 14 owing to an increase in the load the volume of the balloon 58 decreases because of the increasing hydrostatic pressure, and therefore the increase in buoyancy of the pressure rod 16 is partially compensated. The degree of compensation is dependent upon the volume of the balloon 58 and the pressure of the air therein.

Instead of using an air- or gas-filled balloon it is also possible to use an air-filled or evacuated compartment which is closed by means of an elastic membrane or diaphragm.

For the purpose of eliminating temperature influences upon the air volume in the balloon 58 there can be provided a thermostat or equivalent structure, as such has been schematically depicted by reference character 100.

Figure 3:
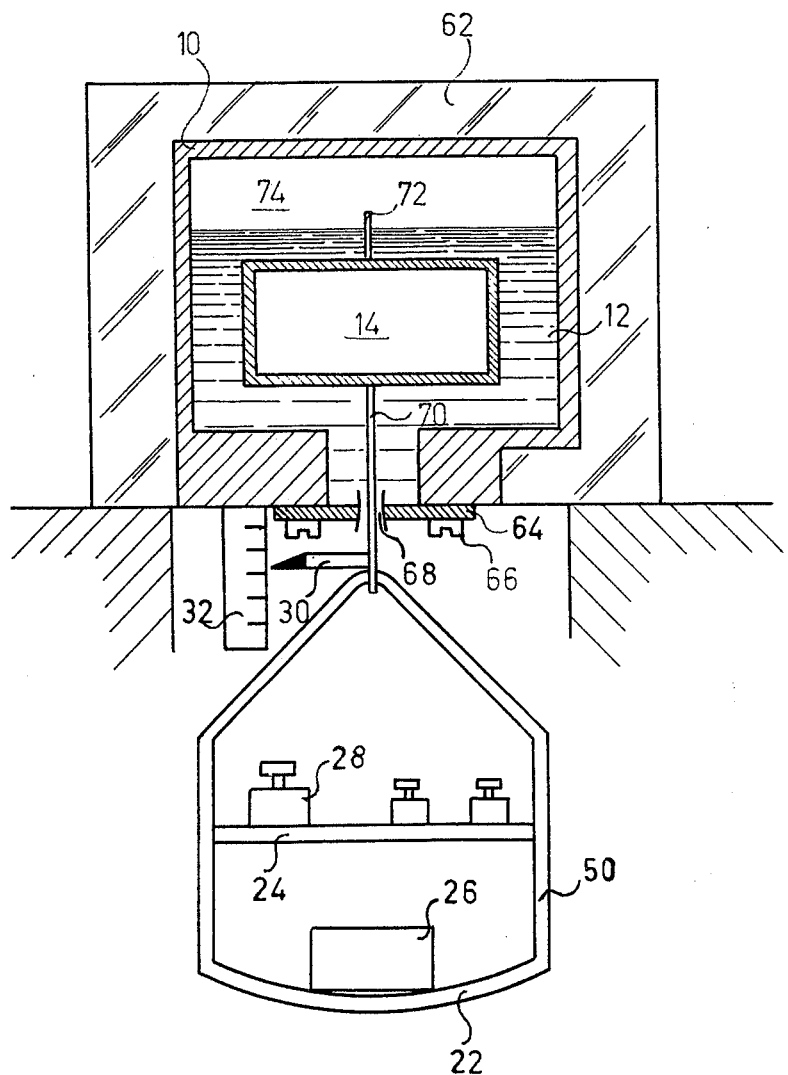
FIG. 3 is a front view, partially in section, of a further exemplary embodiment of the invention.

Turning now attention to the exemplary embodiment of load balance depicted in FIG. 3 it will be recognized that the container 10 is surrounded by an insulating jacket or shell 62. The container 10 is closed at the top and at the bottom is provided with a diaphragm 64 which is fixed at the container 10 by means of four screws 66 or equivalent structure, and wherein only two such screws are visible in the drawing. A wire 70 extends through a central opening 68 in such diaphragm 64, this wire 70 establishing the connection between the buoyant or floating body 14 and the balance suspension arrangement or hanger 50. A further wire 72, the diameter of which is slightly greater than the diameter of the wire 70, extends upwardly from the lift body 14.

During an increase in the load 26 the buoyant body 14 sinks and part of the wire 70 moves out of the fluid or liquid 12 (loss in buoyancy), whereas at the same time a corresponding length of the wire 72 immerses into the fluid 12 (gain in buoyancy). By appropriately selecting the wire diameter it is therefore possible to obtain maximum sensitivites.

As will be apparent from the illustration the container 10 is not completely filled with the fluid 12, so that there is formed in its upper region or zone an air compartment 74 which is at a negative pressure. This negative pressure prevents a running out of the fluid or liquid 12 through the opening 68.

It will be appreciated from what has been discussed above that a number of exemplary embodiments of the balance contemplated by the invention have been described. It has been demonstrated that the principle of the partially compensated buoyancy change offers the possibility of realizing great and maximum sensitivities for large weighing ranges, something which is especially advantageous for comparative measurements and the determination of weight changes.

The invention can be modified in a number of different ways. Thus, it can be advantageous for certain situations, instead of using only one buoyant or floating body to use a number thereof. Apart from using water as the fluid, depending upon the intended purpose and function of the equipment, there can be considered a great number of other fluids or liquids (even if water as a general rule constitutes the most economical solution) and wherein from case to case there must be taken into account the influence of the viscosity, density (and its change as a function of the temperature) and surface tension.

Instead of using only one pressure rod it would be possible, for instance, for reasons of stability, to provide a number thereof. Also the pressure rods can possess varying cross-section in order to for instance compensate the non-linearity of the characteristic of a gas cushion as the compensation element.

The illustrated exemplary embodiments, apart from their principle robustness, are relatively simple to fabricate and therefore, also because of their extensive freedom from maintenance, are very economical. Of course, it is possible to undertake a number of measures for increasing the operating comfort, thus for instance to mechanize the operation of the weights or to automate the indication, for instance with photoelectric means.

While there is shown and described present preferred embodiments of the invention, it is to be distinctly understood that the invention is not limited thereto but may be otherwise variously embodied and practiced within the scope of the following claims. Accordingly,

What is claimed is:

1. A buoyancy balance comprising a buoyant body floating in a fluid, a container for containing the fluid, a load scale, means for coupling the load scale with the buoyant body, and means for partially compensating the change in buoyancy brought about by the movement of the load scale.

2. The buoyancy balance as defined in claim 1, wherein said compensating means comprises means providing a gas cushion operatively connected with the buoyant body.

3. The buoyancy balance as defined in claim 1, wherein said compensating means comprises a supplementary element piercingly extending through a boundary surface of the fluid.

4. The buoyancy balance as defined in claim 1, further including a separate fluid-filled container arranged externally of the fluid in which said buoyant body floats, a first pipe member immersed in said container, a second pipe member operatively connected with the first pipe member, said second pipe member being secured to said buoyant body such that it is located completely within the fluid in which the buoyant body floats.

5. The buoyancy balance as defined in claim 1, wherein the load scale is located beneath the buoyant body and is connected via rod means with such buoyant body, hinge means for coupling the load scale with said rod means, said rod means and hinge means defining said coupling means.

6. The buoyancy balance as defined in claim 1, wherein said fluid contains an additive for reducing its surface tension.

7. The buoyancy balance as defined in claim 1, wherein at least part of the coupling means immerses in the fluid and said part is at least partially provided with a coating which alters the adhesion of the fluid at such immersed part of said coupling means.

8. The buoyancy balance as defined in claim 1, further including thermostat means for stabilizing the temperature of the fluid.

9. The buoyancy balance as defined in claim 3, wherein said coupling means comprises a wire, said load scale being suspended at said wire below the buoyant body, said supplementary element comprising a further wire, both wires having different cross-sections.

10. A method of determining the weight changes as a function of time of a human being, which comprises:
 a. placing the human being on a buoyancy balance;
 b. providing in said balance a buoyant body floating in a contained fluid;
 c. providing a load scale and means for coupling the load scale with the buoyant body;
 d. partially compensating the change in buoyancy brought about by the movement of the load scale.

* * * * *